(12) United States Patent
Eisen et al.

(10) Patent No.: US 9,690,586 B2
(45) Date of Patent: *Jun. 27, 2017

(54) PROCESSING OF MULTIPLE INSTRUCTION STREAMS IN A PARALLEL SLICE PROCESSOR

(71) Applicant: INTERNATIONAL BUSINESS MACHINES CORPORATION, Armonk, NY (US)

(72) Inventors: Lee Evan Eisen, Round Rock, TX (US); Hung Qui Le, Austin, TX (US); Jentje Leenstra, Bondorf (DE); Jose Eduardo Moreira, Irvington, NY (US); Bruce Joseph Ronchetti, Austin, TX (US); Brian William Thompto, Austin, TX (US); Albert James Van Norstrand, Jr., Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 146 days.

This patent is subject to a terminal disclaimer.

(21) Appl. No.: 14/302,589

(22) Filed: Jun. 12, 2014

(65) Prior Publication Data
US 2015/0324207 A1 Nov. 12, 2015

Related U.S. Application Data

(63) Continuation of application No. 14/274,942, filed on May 12, 2014.

(51) Int. Cl.
*G06F 9/38* (2006.01)
*G06F 9/46* (2006.01)
(Continued)

(52) U.S. Cl.
CPC ............ *G06F 9/38* (2013.01); *G06F 9/30149* (2013.01); *G06F 9/3851* (2013.01);
(Continued)

(58) Field of Classification Search
CPC .. G06F 9/3851; G06F 9/30149; G06F 9/3867; G06F 9/3836; G06F 9/38; G06F 9/3887
(Continued)

(56) References Cited

U.S. PATENT DOCUMENTS

| | | | |
|---|---|---|---|
| 4,858,113 | A | 8/1989 | Saccardi |
| 5,055,999 | A | 10/1991 | Frank et al. |

(Continued)

FOREIGN PATENT DOCUMENTS

| | | | |
|---|---|---|---|
| CN | 101021778 A | | 8/2007 |
| CN | 101676865 A | | 3/2010 |

(Continued)

OTHER PUBLICATIONS

Office Action in U.S. Appl. No. 14/274,942 mailed on Mar. 9, 2016, 36 pages. (pp. 1-36 in pdf).

(Continued)

*Primary Examiner* — Daniel Pan
(74) *Attorney, Agent, or Firm* — Mitch Harris, Atty at Law, LLC; Andrew M. Harris; Steven L. Bennett

(57) ABSTRACT

A method of managing instruction execution for multiple instruction streams using a processor core having multiple parallel instruction execution slices provides instruction processing flexibility. An event is detected indicating that either resource requirement or resource availability for a subsequent instruction of an instruction stream will not be met by the instruction execution slice currently executing the instruction stream. In response to detecting the event, dispatch of at least a portion of the subsequent instruction is made to another instruction execution slice. The event may (Continued)

be a compiler-inserted directive, may be an event detected by logic in the processor core, or may be determined by a thread sequencer. The execution slices may be dynamically reconfigured as between single-instruction-multiple-data (SIMD) instruction execution, ordinary instruction execution, wide instruction execution. When an execution slice is busy processing a current instruction for one of the streams, another slice can be selected to proceed with execution.

4 Claims, 7 Drawing Sheets

(51) Int. Cl.
 *G06F 15/80* (2006.01)
 *G06F 9/30* (2006.01)
(52) U.S. Cl.
 CPC .......... *G06F 9/3867* (2013.01); *G06F 9/3836* (2013.01); *G06F 9/3887* (2013.01)
(58) Field of Classification Search
 USPC .................................................. 712/22, 215
 See application file for complete search history.

(56) References Cited

U.S. PATENT DOCUMENTS

| | | | |
|---|---|---|---|
| 5,095,424 A | 3/1992 | Woffinden et al. | |
| 5,471,593 A | 11/1995 | Branigin | |
| 5,475,856 A | 12/1995 | Kogge | |
| 5,553,305 A | 9/1996 | Gregor et al. | |
| 5,630,149 A | 5/1997 | Bluhm | |
| 5,680,597 A | 10/1997 | Kumar et al. | |
| 5,822,602 A | 10/1998 | Thusoo | |
| 5,996,068 A | 11/1999 | Dwyer, III et al. | |
| 6,044,448 A | 3/2000 | Agrawal et al. | |
| 6,073,215 A | 6/2000 | Snyder | |
| 6,073,231 A | 6/2000 | Bluhm et al. | |
| 6,092,175 A | 7/2000 | Levy et al. | |
| 6,112,019 A | 8/2000 | Chamdani et al. | |
| 6,119,203 A | 9/2000 | Snyder et al. | |
| 6,138,230 A | 10/2000 | Hervin et al. | |
| 6,145,054 A | 11/2000 | Mehrotra et al. | |
| 6,170,051 B1 | 1/2001 | Dowling | |
| 6,212,544 B1 | 4/2001 | Borkenhagen et al. | |
| 6,286,027 B1 | 9/2001 | Dwyer, III et al. | |
| 6,311,261 B1 | 10/2001 | Chamdani et al. | |
| 6,336,183 B1 | 1/2002 | Le et al. | |
| 6,356,918 B1 | 3/2002 | Chuang et al. | |
| 6,381,676 B2 | 4/2002 | Aglietti et al. | |
| 6,425,073 B2* | 7/2002 | Roussel ......................... 712/221 | |
| 6,463,524 B1 | 10/2002 | Delaney et al. | |
| 6,549,930 B1 | 4/2003 | Chrysos et al. | |
| 6,564,315 B1 | 5/2003 | Keller et al. | |
| 6,728,866 B1 | 4/2004 | Kahle et al. | |
| 6,732,236 B2 | 5/2004 | Favor | |
| 6,839,828 B2 | 1/2005 | Gschwind et al. | |
| 6,847,578 B2 | 1/2005 | Ayukawa et al. | |
| 6,868,491 B1 | 3/2005 | Moore | |
| 6,883,107 B2 | 4/2005 | Rodgers et al. | |
| 6,948,051 B2 | 9/2005 | Rivers et al. | |
| 6,954,846 B2 | 10/2005 | Leibholz et al. | |
| 6,978,459 B1 | 12/2005 | Dennis et al. | |
| 7,020,763 B2 | 3/2006 | Saulsbury et al. | |
| 7,024,543 B2 | 4/2006 | Grisenthwaite et al. | |
| 7,086,053 B2 | 8/2006 | Long et al. | |
| 7,114,163 B2 | 9/2006 | Hardin et al. | |
| 7,124,160 B2 | 10/2006 | Saulsbury et al. | |
| 7,155,600 B2 | 12/2006 | Burky et al. | |
| 7,263,624 B2 | 8/2007 | Marchand et al. | |
| 7,290,261 B2 | 10/2007 | Burky et al. | |
| 7,302,527 B2 | 11/2007 | Barrick et al. | |
| 7,386,704 B2 | 6/2008 | Schulz et al. | |
| 7,469,318 B2 | 12/2008 | Chung et al. | |
| 7,478,225 B1 | 1/2009 | Brooks et al. | |
| 7,512,724 B1 | 3/2009 | Dennis et al. | |
| 7,565,652 B2 | 7/2009 | Janssen et al. | |
| 7,600,096 B2 | 10/2009 | Parthasarathy et al. | |
| 7,669,035 B2 | 2/2010 | Young et al. | |
| 7,669,036 B2 | 2/2010 | Brown et al. | |
| 7,694,112 B2 | 4/2010 | Barowski et al. | |
| 7,721,069 B2 | 5/2010 | Ramchandran et al. | |
| 7,836,317 B2 | 11/2010 | Marchand et al. | |
| 7,889,204 B2 | 2/2011 | Hansen et al. | |
| 7,975,134 B2 | 7/2011 | Gonion | |
| 7,987,344 B2 | 7/2011 | Hansen et al. | |
| 8,046,566 B2 | 10/2011 | Abernathy et al. | |
| 8,074,224 B1 | 12/2011 | Nordquist et al. | |
| 8,099,556 B2 | 1/2012 | Ghosh et al. | |
| 8,103,852 B2 | 1/2012 | Bishop et al. | |
| 8,108,656 B2* | 1/2012 | Katragadda ........... G06F 9/5044 709/205 | |
| 8,135,942 B2 | 3/2012 | Abernathy et al. | |
| 8,141,088 B2 | 3/2012 | Morishita et al. | |
| 8,166,282 B2 | 4/2012 | Madriles et al. | |
| 8,250,341 B2 | 8/2012 | Schulz et al. | |
| 8,386,751 B2 | 2/2013 | Ramchandran et al. | |
| 8,412,914 B2 | 4/2013 | Gonion | |
| 8,464,025 B2 | 6/2013 | Yamaguchi et al. | |
| 8,555,039 B2 | 10/2013 | Rychlik | |
| 8,683,182 B2 | 3/2014 | Hansen et al. | |
| 8,713,263 B2 | 4/2014 | Bryant | |
| 8,966,232 B2 | 2/2015 | Tran | |
| 8,984,264 B2 | 3/2015 | Karlsson et al. | |
| 2002/0194251 A1 | 12/2002 | Richter et al. | |
| 2004/0111594 A1 | 6/2004 | Feiste et al. | |
| 2004/0172521 A1* | 9/2004 | Hooker ............... G06F 9/30043 712/225 | |
| 2004/0181652 A1* | 9/2004 | Ahmed ............... G06F 9/30036 712/215 | |
| 2004/0216101 A1 | 10/2004 | Burky et al. | |
| 2007/0022277 A1 | 1/2007 | Iwamura et al. | |
| 2007/0079303 A1* | 4/2007 | Du .......................... G06F 8/451 717/151 | |
| 2008/0098260 A1* | 4/2008 | Okawa .................... G06F 9/505 714/10 | |
| 2008/0133885 A1 | 6/2008 | Glew | |
| 2008/0313424 A1 | 12/2008 | Gschwind | |
| 2009/0037698 A1 | 2/2009 | Nguyen | |
| 2009/0113182 A1 | 4/2009 | Abernathy et al. | |
| 2010/0100685 A1 | 4/2010 | Kurosawa et al. | |
| 2012/0110271 A1 | 5/2012 | Boersma et al. | |
| 2014/0215189 A1 | 7/2014 | Airaud et al. | |
| 2014/0244239 A1 | 8/2014 | Nicholson et al. | |
| 2015/0324205 A1* | 11/2015 | Eisen .................. G06F 9/30149 712/215 | |

FOREIGN PATENT DOCUMENTS

| | | |
|---|---|---|
| CN | 101876892 A | 11/2010 |
| CN | 102004719 A | 4/2011 |

OTHER PUBLICATIONS

U.S. Appl. No. 14/274,942, May 12, 2014, Eisen, et al.
U.S. Appl. No. 14/274,927, May 12, 2014, Eisen, et al.
U.S. Appl. No. 14/300,563, Jun. 10, 2014, Eisen, et al.
Pechanek, et al., "ManArray Processor Interconnection Network: An Introduction", Euro-Par' 99 Parallel Processing, Lecture Notes in Computer Science, 5th International Euro-Par Conference, Aug. 31-Sep. 3, 1999 Proceedings, pp. 761-765, vol. 1685, Spring Berlin Heidelberg, Toulouse, France.
Pechanek, et al., "The ManArray Embedded Processor Architecture",Proceedings of the 26th Euromicro Conference, IEEE Computer Society, Sep. 5-7, 2000, pp. 348-355, vol. 1, Maastricht.
List of IBM Patents or Patent Applications Treated as Related, 1 page.
U.S. Appl. No. 14/594,716, Jan. 12, 2015, Eisen, et al.
U.S. Appl. No. 14/595,549, Jan. 13, 2015, Brownscheidle, et al.
U.S. Appl. No. 14/595,635, Jan. 13, 2015, Ayub, et al.

(56) References Cited

OTHER PUBLICATIONS

U.S. Appl. No. 14/480,680, Sep. 9, 2014, Boersma, et al.
U.S. Appl. No. 14/574,644, Dec. 18, 2014, Boersma, et al.
List of IBM Patents or Patent Applications Treated as Related, 2 pages.
U.S. Appl. No. 14/723,940, May 28, 2015, Eisen, et al.
U.S. Appl. No. 14/724,073, May 28, 2015, Brownscheidle, et al.
U.S. Appl. No. 14/724,268, May 28, 2015, Ayub, et al.
U.S. Appl. No. 14/501,152, Sep. 30, 2014, Chu, et al.
U.S. Appl. No. 14/869,305, Sep. 29, 2015, Chu, et al.
Gebhart et al., "A Hierarchical Thread Scheduler and Register File for Energy-Efficient Throughput Processors", ACM Transactions on Computer Systems, vol. 30, No. 2, Article 8, Publication date: Apr. 2012, pp. 8:1-8:38, © 2012 ACM, <http://doi.acm.org/10.1145/2166879.2166882>.
"Method and system for Implementing "Register Threads" in a Simultaneously-Multithreaded (SMT) Processor Core", An IP.com Prior Art Database Technical Disclosure, Authors et. al.: Disclosed Anonymously, IP.com Number: IPCOM000199825D, IP.com Electronic Publication: Sep. 17, 2010, pp. 1-4, <http://ip.com/IPCOM/000199825>.
List of IBM Patents or Patent Applications Treated as Related, 3 pages.
Czajkowski, et al., "Resource Management for Extensible Internet Servers", Proceedings of the $8^{th}$ ACM SIGOPS European Workshop on Support for Composing Distributed Applications, Sep. 1998, pp. 33-39, ACM, Portugal.
Bridges, et al., "A CPU Utilization Limit for Massively Parallel Mimd Computers", Fourth Symposium on the Frontiers of Massively Parallel Computing, Oct. 19-21, 1992, pp. 83-92, IEEE, VA, US.
Final Office Action in U.S. Appl. No. 14/274,942 mailed on Aug. 12, 2016, 24 pages (pp. 1-24 in pdf).
Notice of Allowance in U.S. Appl. No. 14/274,942 mailed on Oct. 21, 2016, 8 pages (pp. 1-8 in pdf).

\* cited by examiner

PROCESSING OF MULTIPLE INSTRUCTION STREAMS IN A PARALLEL SLICE PROCESSOR

The present application is a Continuation of U.S. patent application Ser. No. 14/274,942, filed on May 12, 2014 and claims priority thereto under 35 U.S.C. §120. The disclosure of the above-referenced parent U.S. patent application is incorporated herein by reference.

BACKGROUND OF THE INVENTION

1. Field of the Invention

The present invention is related to processing systems and processors, and more specifically to techniques for processing multiple instruction streams in a slice-based processor core.

2. Description of Related Art

In present-day processor cores, pipelines are used to execute multiple hardware threads corresponding to multiple instruction streams, so that more efficient use of processor resources can be provided through resource sharing and by allowing execution to proceed even while one or more hardware threads are waiting on an event.

In existing systems, specific resources and pipelines are typically allocated for execution of the different instruction streams and multiple pipelines allow program execution to continue even during conditions when a pipeline is busy. However, resources are still tied up for pipelines that are busy, and when all the pipeline(s) assigned to an instruction stream are busy, the instruction stream is stalled, reducing the potential throughput of the processor core.

It would therefore be desirable to provide a method for processing program instructions that provides improved flexibility and throughput.

BRIEF SUMMARY OF THE INVENTION

The invention is embodied in a method of operation of a computer system.

The method detects an event corresponding to dispatch of an instruction of one of multiple instruction streams that indicates that mapping between multiple parallel instruction execution slices and the instruction streams should be changed due to a change in resource availability or requirements for execution of a subsequent instruction of the instruction stream. In response to detecting the event, which may be an instruction wider than the individual instruction execution slices, a single-instruction-multiple-data (SIMD) instruction, or busy condition at an instruction execution slice currently executing instructions for the instruction stream, at least a portion of a subsequent instruction for the instruction stream is dispatched to a selected one of the instruction execution slices that was assigned to another instruction stream during the previous execution cycle. The event detection and dispatching may be controlled by the processor, or the program code for the instruction streams may be generated by a compiler that inserts a directive corresponding to the event to control the dispatch, or the program code may be modified by a thread scheduler of the operating system that preprocesses the instruction stream program code to insert directives.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to processors and processing systems in which conventional pipelines are replaced with instruction execution slices that can be assigned arbitrarily to execute instructions. In particular, when an instruction execution slice executing a current instruction for a stream is busy, and in which instruction execution slices can be combined on-the-fly to execute either wider instructions or single-instruction-multiple-data (SIMD) instructions requiring multiple instruction execution slices to handle the multiple data. Also when an instruction execution slice is busy waiting on an external event, or executing a lengthy instruction or multiple instructions, another instruction execution slice may be used to execute one or more subsequent instructions for the instruction stream that would otherwise be held up waiting for the end of the busy condition. In particular, when an event corresponding to a wide instruction, SIMD instruction or busy condition is encountered or expected, dispatch of the instructions for the instruction streams can be modified to effectively use processor core resources to process the SIMD or wide instructions and to avoid stalls due to the busy condition where resources are otherwise available. The dispatch can be modified on-the-fly in response to detecting the event by processor control logic, or the dispatch can be modified in response to software cues, such as directives embedded in the program code by compiler or thread sequencer, or by a separate dispatch control stream.

Figure 1:
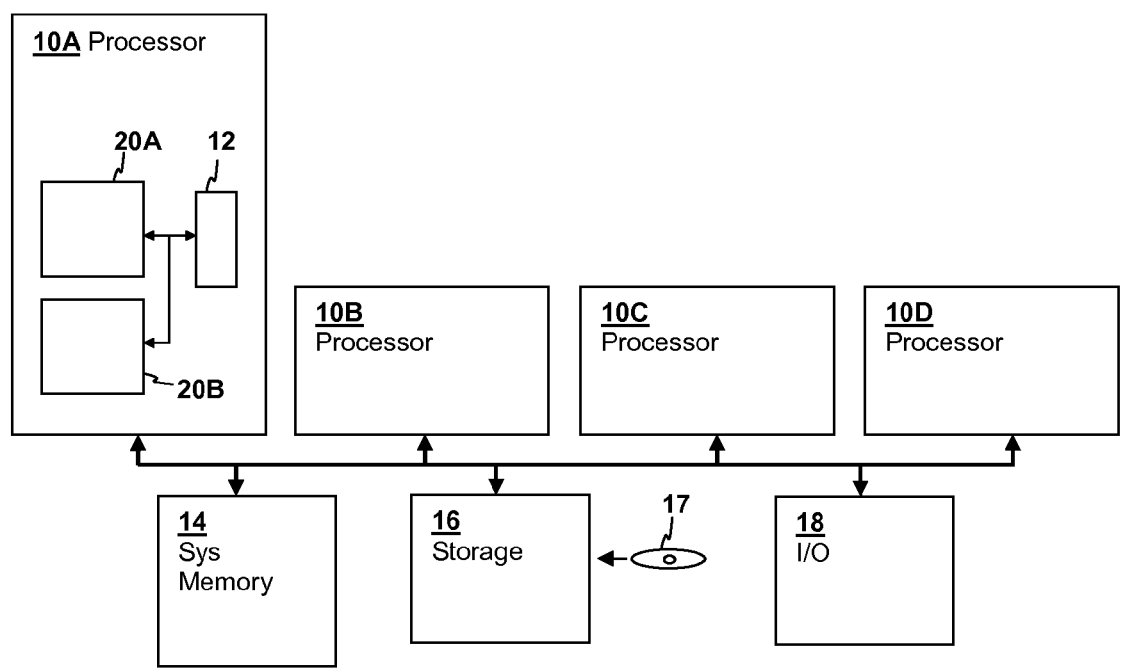
FIG. 1 is a block diagram illustrating a processing system in which techniques according to an embodiment of the present invention are practiced.

Referring now to FIG. 1, a processing system in accordance with an embodiment of the present invention is shown. The depicted processing system includes a number of processors 10A-10D, each in conformity with an embodiment of the present invention. The depicted multi-processing system is illustrative, and a processing system in accordance with other embodiments of the present invention include uni-processor systems having multi-threaded cores. Processors 10A-10D are identical in structure and include cores 20A-20B and a local storage 12, which may be a cache level, or a level of internal system memory. Processors 10A-10B are coupled to a main system memory 14, a storage subsystem 16, which includes non-removable drives and optical drives, for reading media such as a CD-ROM 17 forming a computer program product and containing program instructions implementing generally, at least one operating system, associated applications programs, and optionally a hypervisor for controlling multiple operating systems' partitions for execution by processors 10A-10D. The illustrated processing system also includes input/output (I/O) interfaces and devices 18 such as mice and keyboards for receiving user input and graphical displays for displaying information. While the system of FIG. 1 is used to provide an illustration of a system in which the processor architecture of the present invention is implemented, it is understood that the depicted architecture is not limiting and is intended to provide an example of a suitable computer system in which the techniques of the present invention are applied.

Figure 2:
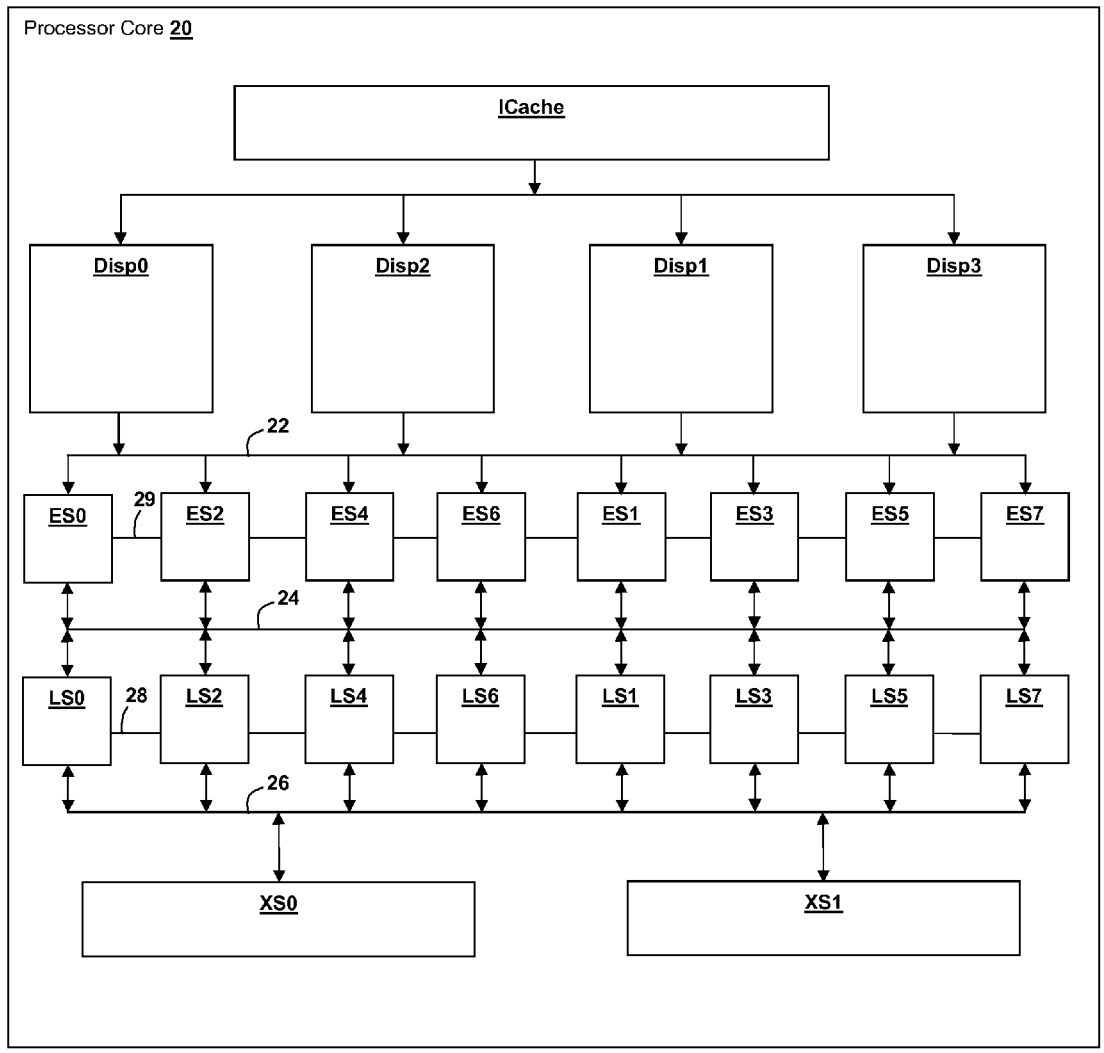
FIG. 2 is a block diagram illustrating details of a processor core 20 that can be used to implement processor cores 20A-20B of FIG. 1.

Referring now to FIG. 2, details of an exemplary processor core 20 that can be used to implement processor cores 20A-20B of FIG. 1 are illustrated. Processor core 20 includes an instruction cache ICache that stores multiple instruction streams fetched from higher-order cache or system memory and presents the instruction stream(s) to a plurality of dispatch queues Disp0-Disp3. Control logic within processor core 20 controls the dispatch of instructions from dispatch queues Disp0-Disp3 to a plurality of instruction execution slices ES0-ES7 via a dispatch routing network 22 that permits instructions from any of dispatch queues Disp0-Disp3 to any of instruction execution slices ES0-ES7, although complete cross-point routing, i.e., routing from any dispatch queue to any slice is not a requirement of the invention. Instruction execution slices ES0-ES7 perform sequencing and execution of logical, mathematical and other operations as needed to perform the execution cycle portion of instruction cycles for instructions in the instructions streams, and may be identical general-purpose instruction execution slices ES0-ES7, or processor core 20 may include special-purpose execution slices ES0-ES7. Instruction execution slices ES0-ES7 may include multiple internal pipelines for executing multiple instructions and/or portions of instructions, so that the indication of "busy" as described herein may also include a condition in which a particular one of instruction execution slices ES0-ES7 is busy processing multiple instructions for a given instruction stream. Instruction execution slices ES0-ES7 are coupled by an execution slice communication network 29 through which values can be exchanged between instruction execution slices ES0-ES7, for example when further processing is performed by one slice on values generated by another execution slice. A fully-routed (or cross-point) network may be used to implement execution slice communication network 29. Alternatively, the connections between instruction execution slices ES0-ES7 may be made only between particular groups of instruction execution slices, e.g., only neighboring slices might be connected in some implementations. Execution slice communication network 29 is also used for tandem execution of SIMD or large-operand instructions that require concurrent/coordinated execution, although execution of such instructions can be performed in a de-coupled manner, as well.

The load-store portion of the instruction execution cycle, (i.e., the operations performed to maintain cache consistency as opposed to internal register reads/writes), is performed by a plurality of cache slices LS0-LS7, which are coupled to instruction execution slices ES0-ES7 by a write-back (result) routing network 24. In the depicted embodiment, any of cache slices LS0-LS7 can be used to perform load-store operation portion of an instruction for any of instruction execution slices ES0-ES7, but that is not a requirement of the invention. Instruction execution slices ES0-ES7 may issue internal instructions concurrently to multiple pipelines, e.g., an instruction execution slice may simultaneously perform an execution operation and a load/store operation and/or may execute multiple arithmetic or logical operations using multiple internal pipelines. The internal pipelines may be identical, or may be of discrete types, such as floating-point, scalar, load/store, etc. Further, a given execution slice may have more than one port connection to write-back routing network 24, for example, a port connection may be dedicated to load-store connections to cache slices LS0-LS7, while another port may be used to communicate values to and from other slices, such as special-purposes slices, or other instruction execution slices. Write-back results are scheduled from the various internal pipelines of instruction execution slices ES0-ES7 to write-back port(s) that connect instruction execution slices ES0-ES7 to write-back routing network 24. A load-store routing network 28 couples cache slices LS0-LS7 to provide conversion transfers for execution of SIMD instructions, processing of instructions with data width greater than a width of cache slices LS0-LS7 and other operations requiring translation or re-alignment of data between cache slices LS0-LS7. An I/O routing network 26 couples cache slices LS0-LS7 to a pair of translation slices XS0, XS1 that provide access to a next higher-order level of cache or system memory that may be integrated within, or external to, processor core 20. While the illustrated example shows a matching number of cache slices LS0-LS7 and execution slices ES0-ES7, in practice, a different number of each type of slice can be provided according to resource needs for a particular implementation. As mentioned above, dispatch routing network 22 is a unidirectional network, but can also take the form of a cross-point network as shown, as may load-store routing network 28 and I/O routing network 26.

Figure 3:
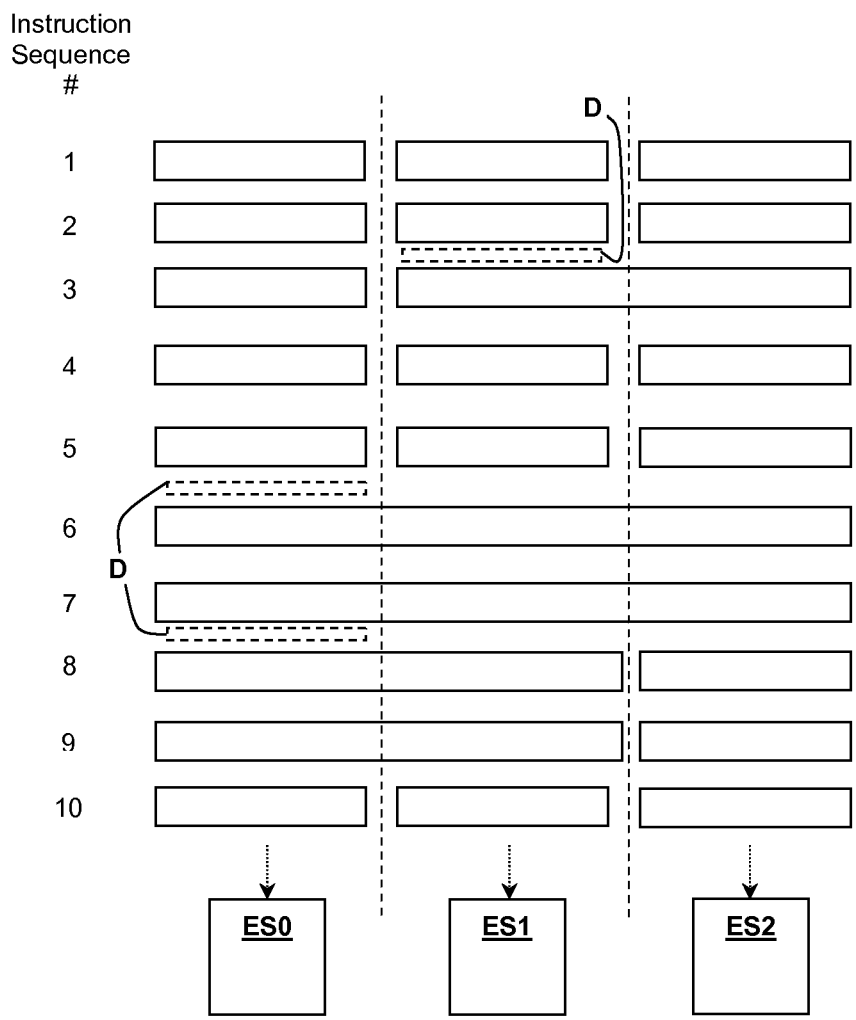
FIG. 3 is a pictorial diagram illustrating a dispatch of instructions by processor core 20.

Referring now to FIG. 3, examples of instruction routing to instruction execution slices ES0, ES1 and ES2 within processor core 20 are shown. In the examples given in this disclosure, it is understood that the instructions dispatched to instruction execution slices may be full external instructions or portions of external instructions, i.e., decoded "internal instructions." Further, in a given cycle, the number of internal instructions dispatched to any of instruction execution slices ES0, ES1 and ES2 may be greater than one and not every one of instruction execution slices ES0, ES1 and ES2 will necessarily receive an internal instruction in a given cycle. FIG. 3 depicts three columns showing sequences of instructions that are sent to instruction execution slices ES0, ES1 and ES2, respectively. Rows correspond to an instruction dispatch sequence of the instructions, and while the rows are aligned for simplicity of illustration, it is understood that in practice that the dispatches will generally not occur simultaneously and there is no constraint between the columns on when an execution slice may complete or receive a particular instruction. In rows 1-2, independent instructions are dispatched to each of instruction execution slices ES0, ES1 and ES2. At row 3, an instruction requiring a wider execution unit is dispatched for execution by dynamically combining instruction execution slices ES1 and ES2, while instruction execution slice ES0 is sent another instruction having a width matching the width of instruction execution slices ES0, ES1 and ES2. At rows 4-5, independent instructions are again dispatched to each of instruction execution slices ES0, ES1 and ES2. In rows 6-7, SIMD instructions having three data values are executed by linking instruction execution slices ES0, ES1 and ES2 to perform the parallel operation, and at rows 8-9, SIMD instructions having two data values are executed by linking instruction execution slices ES0, ES1 while instruction execution slice ES2 is sent other independent instructions. At row 10, instruction execution slices ES0, ES1 and ES2 again commence independent execution of instructions. Directives D are shown as optionally present, and illustrate that if a compiler or thread sequencer inserts directives that control the dispatch, the directives can be embedded in the instruction streams. Alternatively, a separate control stream could be maintained and contain the directives that are then synchronized with the dispatch of program instructions for the instruction streams so that the dispatch is properly modified to handle the cases shown in FIG. 3. The examples provided in FIG. 3 are only illustrative and are provided to show the flexibility of dynamic reconfiguration provided in processor core 20. As can be seen, the configurability provides the potential for maintaining all of instruction execution slices ES0-ES7 in an active execution state while performing various types of operations, such as executing SIMD or variable width instruction streams.

Figure 4:
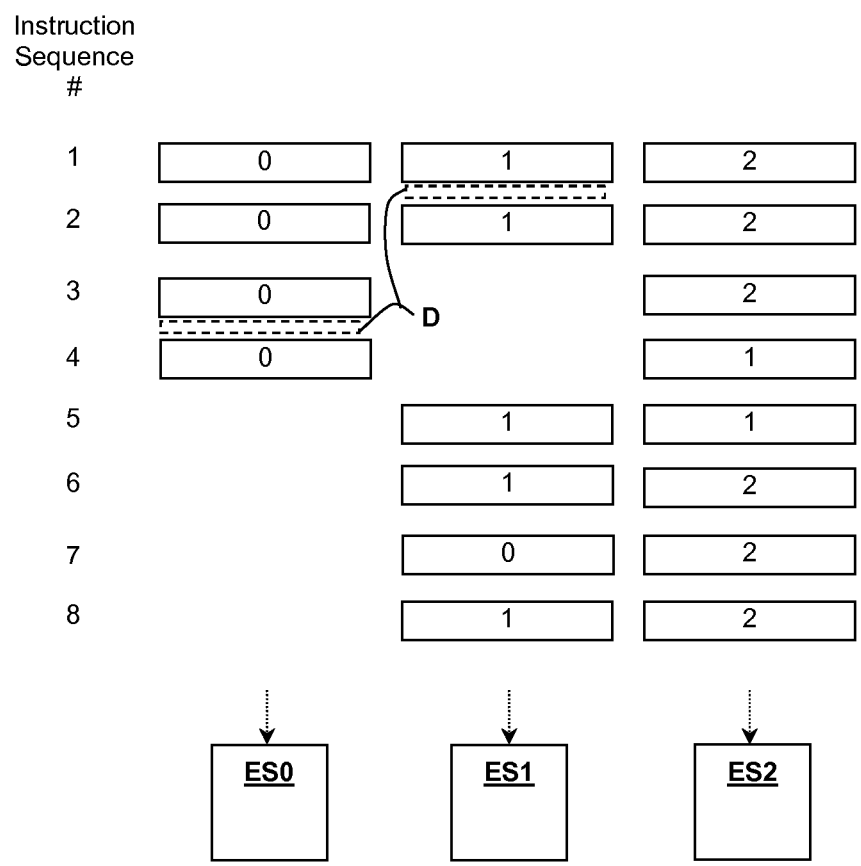
FIG. 4 is a pictorial diagram illustrating another dispatch of instructions by processor core 20.

Referring now to FIG. 4, another example of instruction processing within processor core 20 is shown, and which is illustrated separately in FIG. 4, but that may be combined with any or all of the instruction execution slice reconfigurations provided in the examples of FIG. 3. FIG. 4 depicts three columns showing sequences of instructions that are sent to instruction execution slices ES0, ES1 and ES2, respectively. As in FIG. 3, rows correspond to an instruction sequence and the number shown in each block is the number of an instruction stream numbered from 0 to 2, to which the instructions being executed belong. In rows 1-2, instructions are dispatched to each of instruction execution slices ES0, ES1 and ES2 for each of corresponding instruction streams 0-2. At row 3, instruction execution slice ES1 becomes busy, as instruction execution slice ES1 is still processing the current instruction in instruction stream 1. In row 4, instruction execution slice ES2 is dispatched an instruction for instruction stream 1, either due to a prioritization, round-robin, or other scheme that permits instructions for instruction streams to be routed to instruction execution slices other than a default instruction execution slice for the instruction stream. In Row 5, instruction execution slice ES0 becomes busy after accepting an instruction from row 4, instruction execution slice ES1 is available to accept further instructions so instruction execution slice ES1 receives dispatch of a next instruction for instruction stream 1. Instruction execution slice ES2 is also executing an instruction for instruction stream 1. In row 6, instruction execution slice ES0 is still busy and instruction execution slices ES1 and ES2 resume execution of instructions for instruction streams 1 and 2, respectively. At row 7, instruction execution slice ES1 is co-opted to execute a next instruction for instruction stream 0, while instruction execution slice ES0 is still busy executing a current instruction and instruction execution slice ES2 executes another instruction for instruction stream 2. In row 8, instruction execution slice ES1 executes an instruction for instruction stream 1, while instruction execution slice ES2 executes another instruction for instruction stream 2. The examples provided in FIG. 4 are only illustrative and are provided to show the flexibility of mapping of instruction stream dispatches provided in processor core 20. As can be seen, the routable dispatch provides the potential for maintaining all of instruction streams in an active execution state, even while a busy condition is encountered for some execution slices. If directives D are included for the events depicted in FIG. 4, they will be inserted by the compiler, thread sequencer or other software, in response to an expected busy condition, e.g., the current program instruction for a slice takes a known count of multiple instruction cycles to execute, or the current program instruction is a wait or stall type instruction that will cause the slice to be reserved for multiple instruction cycles, including stalls based on dependencies or events for which the stall duration may vary depending on which instruction execution slice is used.

Figure 5:
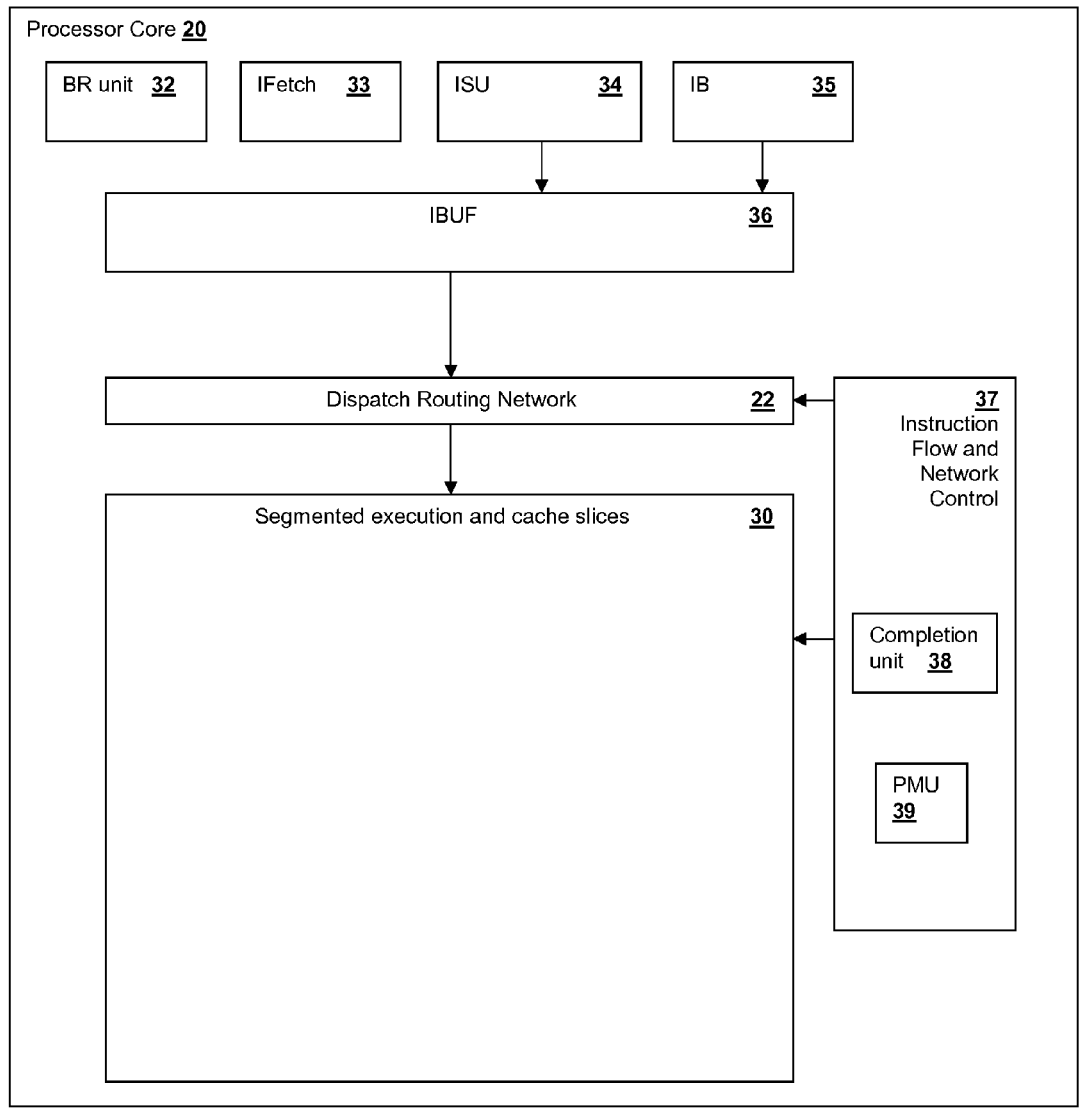
FIG. 5 is a block diagram illustrating details of processor core 20.

Referring now to FIG. 5, further details of processor core 20 are illustrated. Processor core 20 includes a branch execution unit 32 an instruction fetch unit (IFetch) 33 and an instruction sequencer unit (ISU) 34 that control the fetching and sequencing of instructions. A self-learning instruction buffer (IB) 35 groups instructions in order to perform reconfigurations such as those shown in FIG. 3, i.e., arranging instructions in the dispatch queues to setup execution of SIMD and variable-width operations. An instruction buffer (IBUF) 36 is partitioned to maintain dispatch queues (Disp0-Disp3 of FIG. 2) for each of the instruction streams and dispatch routing network 22 couples IBUF 36 to the segmented execution and cache slices 30. An instruction flow and network control block 37 performs control of segmented execution and cache slices 30 and dispatch routing network 22 to perform dynamic control of the slices as illustrated in FIG. 3 and FIG. 4, as well as other operations as described in further detail below. An instruction completion unit 38 is also provided to track completion of instructions sequenced by ISU 34 and to control write-back operations by cache slices within segmented execution and cache slices 30. A power management unit 39 provides for energy conservation by reducing or increasing a number of active slices within segmented execution and cache slices 30. Other details of processor core 20 can be implemented as illustrated in co-pending U.S. patent application entitled "PARALLEL SLICE PROCESSOR WITH DYNAMIC INSTRUCTION STREAM MAPPING", Ser. No. 14/274,927, filed concurrently herewith, which is incorporated herein by reference.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Figure 6:
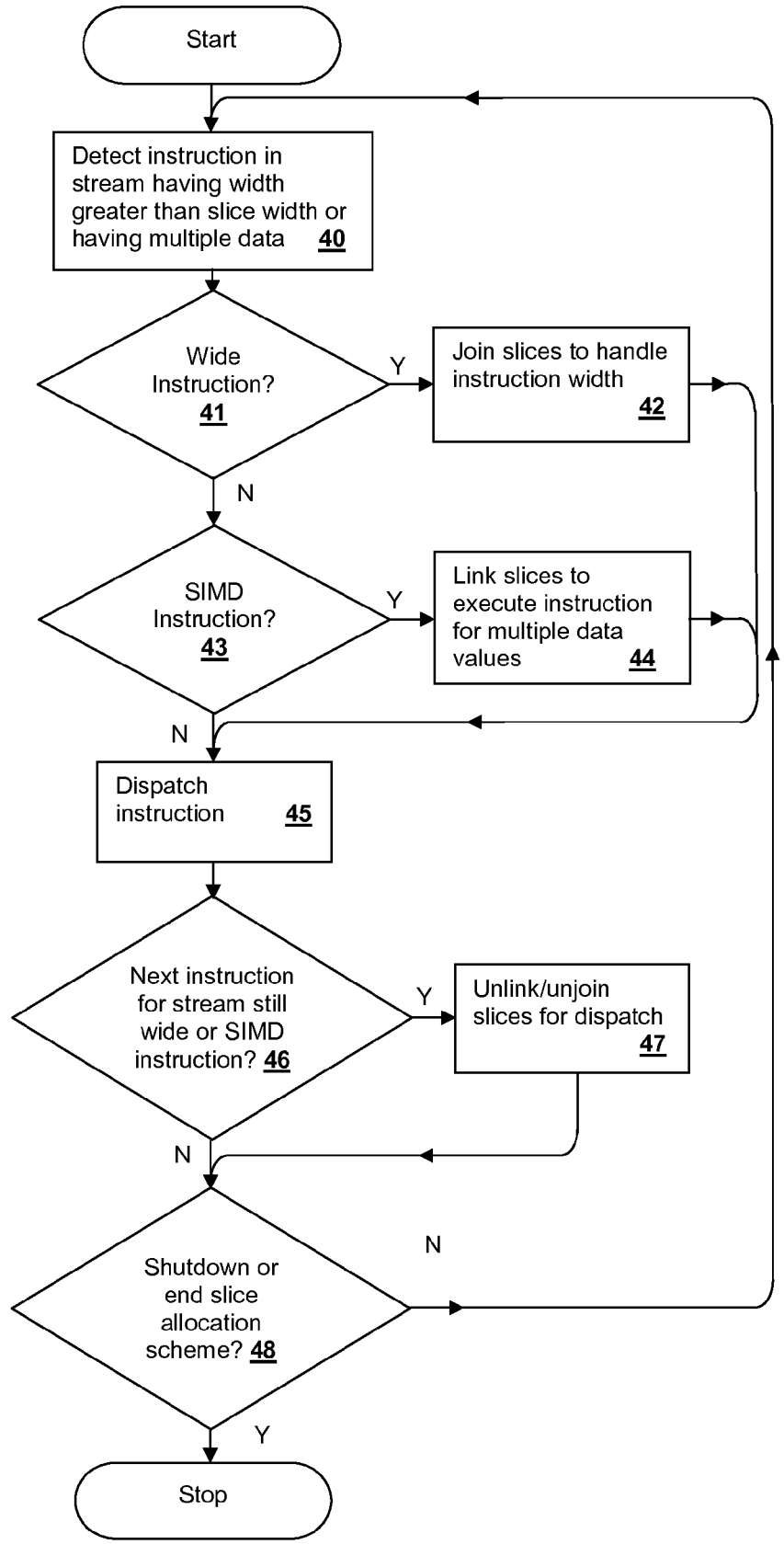
FIG. 6 is a flowchart illustrating a method in accordance with an embodiment of the present invention.

Referring now to FIG. 6, a method according to an embodiment of the invention is shown in a flowchart. The method is a method of processing program instructions in a processor core, and in particular, a method of controlling the dispatch of program instructions of multiple instruction streams to multiple instruction execution slices of the processor core. When an instruction in the instruction stream is detected that has a width greater than the slice width or that has multiple data that would require multiple slices to execute (step 40), if the instruction is a wide instruction (decision 41), slices are jointed to handle the greater instruction width (step 42). If the instruction is an SIMD instruction (decision 43) the slices are linked to execute the instruction for multiple data values (step 44). The instruction is dispatched (step 45) and if the next instruction is not still an SIMD or wide instruction matching the previous instruction format (decision 46), the instruction execution slices are un-joined/unlinked at dispatch (step 47), although the joining or linking of the instruction execution slices persists while the instructions are scheduled for execution and then fully or partially executed within the instruction execution slices. Until the system is shut down or the slice allocation scheme is ended (decision 48), the process of steps 40-47 is repeated. The detection of the wide or SIMD instruction may be performed by the instruction sequencer or other control logic within processor core 20, or alternatively, directives can be embedded in the instruction streams by a compiler or by the operating system thread sequencer pre-processing the program instructions. When processor core 20 detects the directives, the dispatch of instructions for the instruction streams can be adjusted as indicated by the directive.

Figure 7:
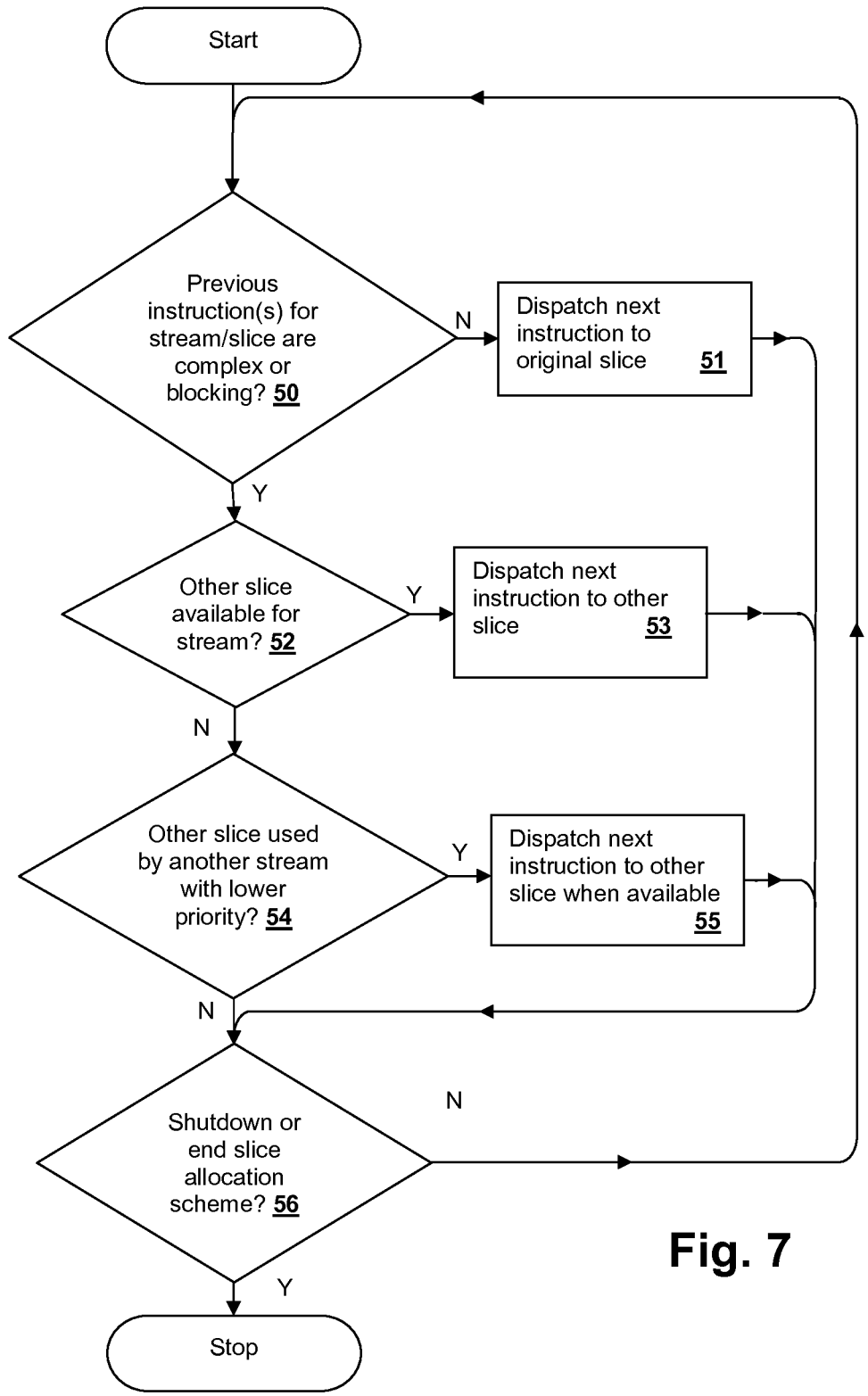
FIG. 7 is a flowchart illustrating another method in accordance with an embodiment of the present invention.

Referring now to FIG. 7, another method according to an embodiment of the invention is shown in a flowchart. The method is another method of processing program instructions in a processor core, and in particular, a method of controlling the dispatch of program instructions of multiple instruction streams to multiple instruction execution slices of the processor core, that may be used in combination with the method of FIG. 6, and that will generally be performed by control logic within processor core 20. However, a compiler or thread sequencer may detect a dependency or a lengthy instruction in program code of an instruction stream and expect a busy condition on an instruction execution slice for one or more instruction cycles, and in anticipation, insert a directive to modify the default dispatching of instructions. When a previously-dispatched instruction has placed one of the instruction execution slices in a blocked (e.g., waiting on an external event) or busy condition (previous instruction is a complex instruction requiring multiple instruction cycles) (decision 50), if another instruction execution slice is available for the instruction stream (decision 52), then the next instruction is dispatched to the other slice (step 53). Otherwise, if the original instruction execution slice is not in a blocked or busy condition (decision 50), the next instruction is dispatched to the original instruction execution slice (step 51). If the original instruction execution slice was in a blocked or busy condition (decision 50), but the other instruction execution slice was not available (decision 52), then if the other slice is in use by another instruction stream with lower priority (decision 54) the next instruction is dispatched to the other instruction execution slice when the other instruction execution slice becomes available (step 55). Until the system is shut down or the slice allocation scheme is ended (decision 56), the process of steps 50-55 is repeated.

As noted above, portions of the present invention may be embodied in a computer program product, e.g., a program executed by a processor having program instructions that direct some or all of the operations outlined above. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per Se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of processing instructions of multiple instruction streams in a processor core having a plurality of instruction execution slices, the method comprising:
   analyzing the multiple instruction streams and detecting, in a first one of the multiple instruction streams, an event indicating that a first instruction requires processing that changes resource availability for execution of a subsequent instruction of the first instruction stream or that the subsequent instruction has execution requirements such that a change in mapping between the instruction execution slices and corresponding ones of the multiple instruction streams is indicated, wherein the subsequent instruction is an instruction having a width greater than a width of each of the plurality of instruction execution slices; and
   responsive to detecting the event, modifying the first one of the multiple instruction streams by inserting a directive in the first one of the multiple instruction streams, wherein the directive, when executed by the another processor core will cause the change in mapping so that at least a portion of the subsequent instruction is dispatched to a selected one of the instruction execution slices that was assigned to a second one of the multiple instruction streams during a previous execution cycle, wherein the dispatching dispatches a first portion of the subsequent instruction to the selected instruction execution slice and a second portion of the subsequent instruction to another instruction execution slice that executed an instruction previous to the first instruction for the first instruction stream, wherein the event is an SIMD instruction and wherein the dispatching dispatches the subsequent instruction to the selected instruction execution slice and another instruction execution slice that executed an instruction previous to the first instruction for the first instruction stream, wherein the selected instruction execution slice and the another instruction execution slice process different data associated with the SIMD instruction.

2. The method of claim 1, wherein the detecting an event detects that another instruction execution slice that executed an instruction previous to the first instruction for the first instruction stream is unavailable.

3. The method of claim 1, further comprising, by a compiler that generates program code of the multiple instruction streams, inserting a directive in the program code to control the dispatching, wherein the detecting detects the directive in the program code, and wherein the dispatching is performed responsive to detecting the directive.

4. The method of claim 1, further comprising, by a scheduler that pre-processes program code of the multiple instruction streams to allocate resources to hardware threads corresponding to the multiple instruction streams, inserting a directive in the program code to control the dispatching, wherein the detecting detects the directive in the program code, and wherein the dispatching is performed responsive to detecting the directive.

* * * * *